United States Patent [19]

Endres et al.

[11] 4,359,310
[45] Nov. 16, 1982

[54] COOLED WALL

[75] Inventors: Wilhelm Endres, Remetschwil; Dilip Mukherjee, Wettingen, both of Switzerland

[73] Assignee: BBC Brown, Boveri & Company Limited, Baden, Switzerland

[21] Appl. No.: 191,382

[22] Filed: Sep. 29, 1980

[30] Foreign Application Priority Data

Dec. 12, 1979 [CH] Switzerland .................. 11324/79

[51] Int. Cl.³ .............................................. F01D 5/14
[52] U.S. Cl. .............................................. 415/115
[58] Field of Search ................ 415/115, 116, 117; 416/95, 96 R, 96 A, 97 R, 97 A, 92; 165/134 R, 185

[56] References Cited

U.S. PATENT DOCUMENTS

| | | | |
|---|---|---|---|
| 2,801,073 | 7/1957 | Savage | 416/96 A |
| 3,013,641 | 12/1961 | Compton | 165/134 |
| 3,032,314 | 5/1962 | David | 416/96 A |
| 3,700,348 | 10/1972 | Corsmeier et al. | 416/96 A |
| 3,767,322 | 10/1973 | Durgin et al. | 416/96 R |

FOREIGN PATENT DOCUMENTS

| | | | |
|---|---|---|---|
| 1601613 | 12/1970 | Fed. Rep. of Germany | 415/115 |
| 56235 | 9/1952 | France | 416/95 |
| 602530 | 5/1948 | United Kingdom | 415/115 |

*Primary Examiner*—Louis J. Casaregola
*Assistant Examiner*—Jeffrey A. Simenauer
*Attorney, Agent, or Firm*—Werner W. Kleeman

[57] ABSTRACT

To improve wall cooling, especially at gas turbine elements, such as buckets or blading, combustion chambers, infeed channels and so forth, it is proposed to arrange a partition wall between an outer plate and an inner plate, for instance formed of sheet metal. The partition wall forms a cooling agent chamber and a pressure equalization chamber. The partition wall preferably consists of a buckle plate whose bulges or protuberances are connected, as by welding, with the outer plate. There is maintained within the pressure equalization chamber a pressure which approximately corresponds to the hot gas pressure at the outer surface of the outer plate, so that there are avoided so-called boiler stresses.

8 Claims, 6 Drawing Figures

COOLED WALL

BACKGROUND OF THE INVENTION

The present invention relates to a new and improved construction of a cooled wall, especially for gas turbine elements, which is of the type comprising an outer plate and an inner plate, for instance formed of sheet metal, between which there flows a cooling agent. The invention also pertains to the use of the novel cooled wall of this development.

With the present day conventional high-temperature gas turbines the individual gas turbine elements, such as blading, thermal dam-up segments, combustion chambers and infeed channels, are predominantly cooled by means of air. At the individual components there are provided cooling air channels through which flows the cooling air and slots and openings through which again exits such air. Thus, for instance, there is blown-off at the blading of a gas turbine part of the cooling air at the outflow edges. The arrangement of cooling air channels in the components requires relatively large wall thicknesses thereof, with the result that at such components or parts there are formed correspondingly great thermal stresses which are effective both in the lengthwise and also transverse direction thereof. These thermal stresses arise both during the non-static and static operation and lead to pronounced thermal loads or stress and can cause fracture of the component or part.

With heretofore known constructions, for instance according to the teachings of U.S. Pat. No. 3,446,481, the aforementioned components or parts are fabricated by precision casting. However, there also are partially used sheet metal constructions in order to maintain the thermal stresses small. In such case the smooth thin outer wall is welded to a corrugated or undulated sheet metal plate serving as the inner wall, to thus form cooling channels for the cooling agent.

However, what is disadvantageous with this state-of-the-art construction is that the corrugated plate serving as the inner wall is only elastic in one direction, so that it expands in conjunction with the hot outer wall in such direction. On the other hand, in the other directions there remains the elongation differences between the hot outer wall and the cool inner wall, and thus considerable thermal stresses appear in such directions.

Since when working with higher gas temperatures there is necessary a pronounced cooling, there is required during the use of air as the cooling agent for the high heat-transfer coefficient at the side of the cooling air also high flow velocities, whereby there results high pressure losses. In such instances it is possible to employ instead of air cooling a vapor or liquid cooling. This cooling system is constructed for instance in a manner such that a massive bucket core is provided at the outer contour thereof with milled or machined portions for receiving cooling agent channels, preferably constituted by tubes, and the tubes are clad with an outer covering. Significant in this regard is German patent publication No. 2,825,801.

However, what is disadvantageous with this arrangement is that the blading or bucket core must be of massive design and must be connected with the outer wall, so that greater thermal stresses exist. A design resorting to embedding of the lines through which there is conducted the liquid in copper would only inappreciably reduce such thermal stresses.

SUMMARY OF THE INVENTION

Therefore, with the foregoing in mind it is a primary object of the present invention to provide a new and improved construction of a cooled wall which is not associated with the aforementioned drawbacks and limitations of the prior art proposals.

Another and more specific object of the present invention aims at providing a wall cooling arrangement which can be utilized at different parts of a thermal machine or apparatus and wherein it is possible to cool the individual components or parts with relatively low pressure losses, and the thermal stresses which arise can be maintained small.

Now in order to implement these and still further objects of the invention, which will become more readily apparent as the description proceeds, the invention is manifested by the features that between the outer plate and the inner plate there is arranged a partition or separation wall, by means of which there is formed in the direction of the outer plate a cooling agent chamber and in the direction of the inner plate a pressure equalization chamber.

It is particularly advantageous if the partition wall is formed from a buckle plate and the individual bulges or protuberances of the buckle plate are welded with the outer plate.

Due to the construction of the partition wall as a buckle plate between the outer plate and the inner plate, there is realized the simple possibility of connecting the individual bulges or humps with the outer plate, preferably by welding. In this manner there is obtained a flow channel having a high turbulence formed by the bulges so that even in the presence of relatively low flow velocities of the cooling medium there can be obtained high heat-transfer coefficients. Furthermore, the buckle plate is extremely elastic in all directions, so that in accordance with the shape of the bulges, bulge diameter, bulge direction, the distribution or pitch thereof and the plate thickness, there can be obtained a reduction in the modulus of elasticity and the lengthwise stiffness or rigidity up to twenty-fold of a smooth sheet metal plate. On the other hand, the buckle plate is extremely stiff to bending. Due to the connection of the outer sheet metal plate with the buckle plate the stiffness or rigidity is further increased. In the presence of high temperatures, upon expansion or elongation of the outer sheet metal plate, it is possible for the inner buckle plate, due to its increased elasticity, to readily follow such expansions or elongations, even if the buckle plate is at an appreciably lower temperature. By virtue of the fact that the buckle plate can expand along with the outer sheet metal plate in both lengthwise and transverse directions, there do not arise any high thermal stresses.

When using water or steam as the cooling agent there is formed an extremely high pressure in the flow channel between the outer sheet metal plate and the buckle plate. Due to welding of the bulges or humps with the outer sheet metal plate there is formed a closed flow channel. In such type constructed channels there can be formed in the sheet metal plates a type of "boiler stress" due to the action of the external pressure of the hot gas, which acts upon the outer surface of the outer sheet metal plate.

In order to avoid such "boiler stress" or at least to reduce the same, it is proposed to provide a pressure equalization chamber between the buckle plate and the inner plate. In such pressure equalization chamber there prevails the same pressure as the external hot gas pressure.

This is advantageously realized in that the pressure equalization chamber is in flow communication with a pressure source.

The build-up of pressure in the pressure equalization chamber can be realized, in the case of a gas turbine, in a simple manner in that this chamber or space is connected with a suitable pressure stage of a compressor.

With an exemplarly use of the cooled wall of the invention in blading of gas turbines, which essentially consist of a blading core having a flow channel, as well as base plate, cover plate, and an outer jacket which encases or clads in a profile-like manner the blading core, there is arranged over the entire length of each bucket or blade between the outer jacket or shell and the blading core the partition wall and within the flow channel there is arranged a lining or cladding which partially covers its inner surface. This lining or cladding is a corrugated plate.

Advantageously, one end of the lining is sealingly connected with the inner surface of the blading core and the other end with the cover plate.

In order to maintain the same pressure in the pressure equalization chamber in relation to the flow channel, it is recommended that the pressure equalization chamber be connected, on the one hand, by means of a connection channel with the pressure source, and, on the other hand, by means of an expansion joint with a space between the blading core and the lining or covering.

To separate the cooling agent chamber from the pressure equalization chamber the ends of the buckle plate are sealingly welded with the cover plate and the base plate.

A particularly advantageously field of application of the inventive cooled wall is in conjunction with combustion chambers, heat dam-up or accumulation segments and infeed channels for gas turbines.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
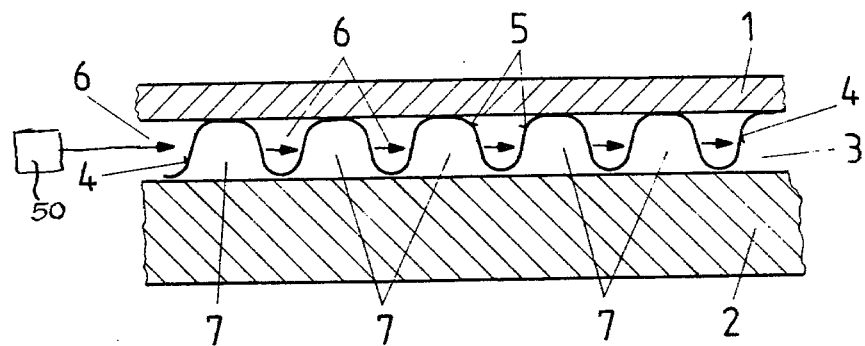
FIG. 1 is a cross-sectional view through part of a cooled wall constructed according to the invention.

Describing now the drawings, according to the showing of FIG. 1 reference character 1 designates an outer sheet metal plate or outer plate, for instance of a combustion chamber of a gas turbine. Operatively associated with the outer plate 1 is an inner sheet metal plate or inner plate 2, so that there is formed between both of these sheet metal plates 1 and 2 a cooling agent chamber or space 3. Internally of the cooling agent chamber 3 there is arranged a partition or separation wall 4, preferably constituted by a so-called buckle sheet metal plate or simply buckle plate. The individual bulges or protuberances 5 of the buckle plate 4 are fixedly connected with the outer sheet metal plate 1, for instance by welding, but of course it is to be expressly understood that other well known connection techniques can be employed, such as soldering, diffusion bonding and so forth. Between the outer plate 1 and the buckle plate 4 there is therefore formed a flow channel, as generally indicated by the arrows 6. A suitable cooling medium flows through the flow channel 6 and about the individual bulges or protuberances 5. Between the buckle sheet metal plate 4 and the inner sheet metal plate 2 there is formed a pressure equalization space or chamber 7, in which prevails the same pressure as the hot gas pressure acting upon the outer surface of the outer plate 1. Due to this arrangement there is avoided or reduced a stress similar to a boiler stress, by virtue of the pressure prevailing in the pressure equalization chamber 7, which otherwise might arise owing to the action of the hot gas pressure upon the outer sheet metal plate and the therewith attached buckle sheet metal plate 4. To generate the pressure within the pressure equalization chamber 7 such is advantageously connected with any suitable and therefore merely schematically illustrated pressure source 50, i.e. for instance in the case of a gas turbine the pressure equalization chamber 7 may be connected with a stage of the compressor.

Figure 2:
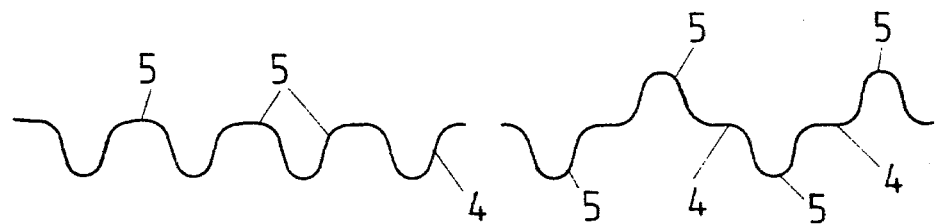
FIG. 2 illustrates exemplary constructions of the bulges or humps of a buckle sheet metal plate.

Now in FIG. 2 there are illustrated exemplary embodiments for designing the buckle sheet metal plate 4, wherein at the left-hand showing of the drawing there have been simply shown bulges or humps 5 which are uniformly distributed over the surface of the buckle plate 4, whereas at the right-hand portion of the illustration there has been shown a buckle plate 4 which is provided at both faces or sides with the bulges or humps 5, and this design has a greater modulus of elasticity and the plane of the sheet metal plate extends almost horizontally between the upwardly and downwardly protruding bulges or humps 5, sometimes also referred to herein as protuberances.

Figure 3:
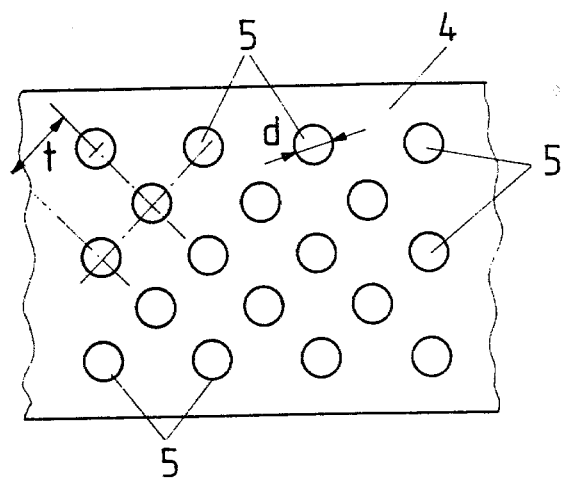
FIG. 3 is a top plan view of part of a buckle sheet metal plate.

As best seen by referring to FIG. 3, the distribution or pitch $t$ between the momentarily neighboring bulges or humps 5 of the buckle plate 4 have a predetermined relationship to the diameter $d$ of the bulges 5. However, this is dependent to a considerable degree upon the thickness of the buckle sheet metal plate 4, so that in contrast to smooth sheet metal plates there can be obtained a reduction of the modulus of elasticity amounting to twenty-fold and more. The design of the shape of the bulges or humps 5 will depend upon the requirements placed upon the partition wall 4.

Figure 4:
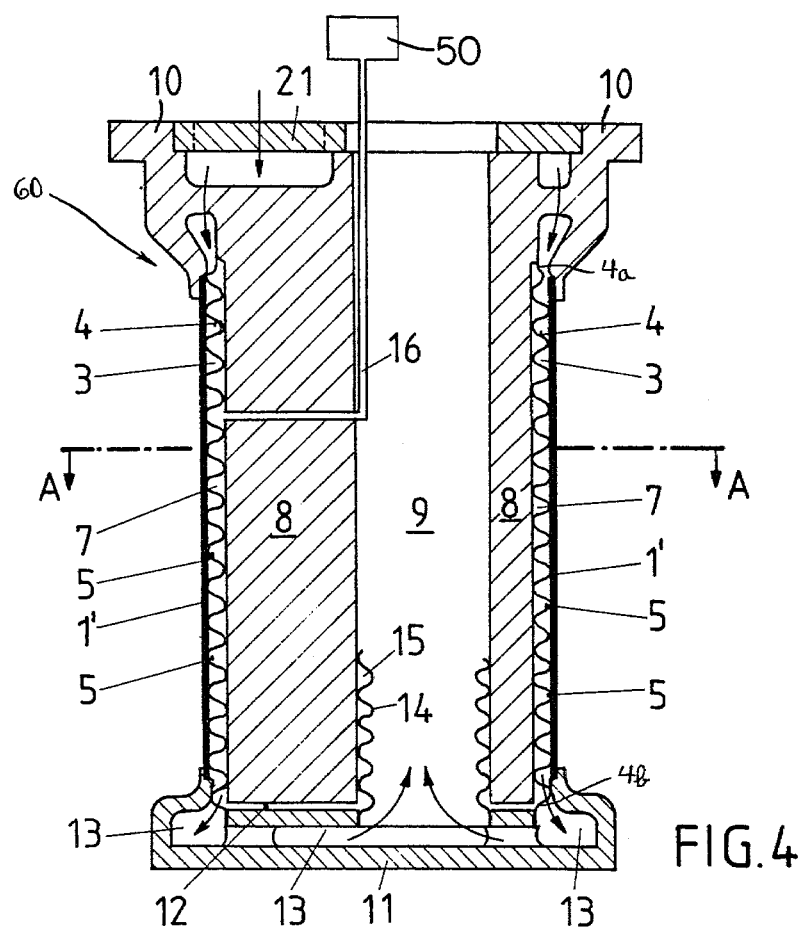
FIG. 4 is a longitudinal sectional view through a cooled turbine blade or bucket.
Figure 5:
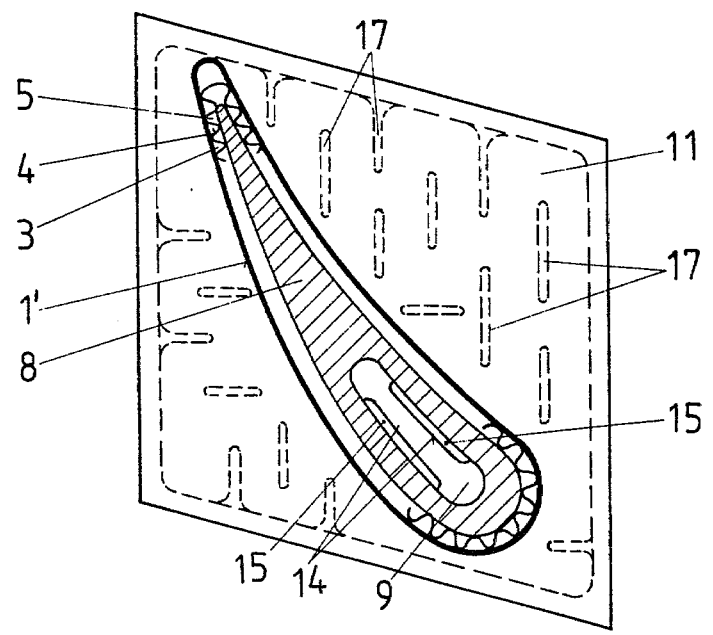
FIG. 5 is a cross-sectional view of the turbine blading of FIG. 4, taken substantially along the line A—A thereof.

In the exemplary embodiment illustrated in FIGS. 4 and 5 showing a possible field of use of the inventive cooled wall at a turbine blade 60 the latter consists of a blade core 8 which, in the embodiment under discussion, is partially hollow and encloses a flow channel 9. Further, this turbine blade or bucket 60 contains a base plate 10, a cover plate 11 and a profile-like structured outer jacket or shell 1' arranged in spaced relationship from the blade core 8. This outer jacket or shell 1' corresponds in its function to the outer sheet metal plate 1 of the arrangement of FIG. 1. The base plate 10 is closed by a cover 21, and the cover plate 11 is attached, for instance by welding, with the blade core 8. Between the blade core 8 and the cover plate 11 there is provided an expansion joint 12. Arranged in the cover plate 11 are channels 13 which flow communicate with the flow channel 9. In the space formed between the outer jacket 1' and the blade core 8 there is arranged a partition or separation wall 4 formed of buckle sheet metal or buckle plating in such a manner that there is formed the cooling agent chamber or space 3 in the direction of the outer jacket 1' and a pressure equalization chamber or space 7 in the direction of the blade core 8. The buckle sheet metal plate 4 is sealingly welded at one end 4a with the inner surface of the blade core 8 and at the other end 4b with the cover plate 11. The individual bulges or humps 5 of the buckle sheet metal plate 4 are welded with the outer shell or jacket 1' or otherwise fixedly connected therewith in any suitable manner therewith. The pressure equalization chamber 7 communicates, on the one hand, by means of the expansion joint 12 with a space or chamber 15 which is bounded by a lining or covering 14, preferably formed by an undulated or corrugated sheet metal plate, and on the other hand, flow communicates by means of a connection line 16 with a merely schematically illustrated pressure source 50. The lining 14 covers part of the inner surface of the flow channel 9.

With this design the cooling medium, indicated by arrows, after cooling the base plate 10, flows in the space between the outer jacket 1' and the buckle sheet metal plate 4, serving as the partition wall, along the axis of the blading. After cooling the cover plate 11 the cooling medium or agent flows through the flow channel 9 within the blading core 8 back to the blading base. Since the outer jacket 1' is impinged by the hot gases, and is rigidly connected with the buckle sheet metal plate 4, the partition wall constituted by the buckle sheet metal plate 4, forms a type of pressure container or vessel and can be considered as a boiler wall. Without providing counter measures there would thus arise in the sheet metal plates a type of boiler stress. This stress is avoided by virtue of the pressure equalization space or chamber 7 between the buckle sheet metal plate 4 and the blade core 8. To this end there is infed, for instance from a not further illustrated compressor stage, as generally represented by reference character 50 of the gas turbine, compressed air via the connection line 16 into the pressure equalization chamber or space 7. Due to the tight welding of both ends of the buckle sheet metal plate 4 with the blading core 8 and the cover plate 11, respectively, there is realized a sealing of the cooling agent chamber or space 3 in relation to the pressure equalization chamber 7, wherein, however, there is not impaired the free expansion of the outer jacket 1' with the buckle plate 4 and the cover plate 11. Since the blading or blade core 8 only performs expansions in the direction of its lengthwise axis, the lining or covering 14 can consist of corrugated sheet metal plating.

Such type cooled turbine blading 60 also could possess a massive blading core 8, wherein then there would have to be provided appropriate flow channels for the return flow of the cooling agent. As a rule, there is required for a cooled turbine blade a blade core, in order to take-up the bending stresses which result from the aerodynamic forces. In the case of turbine blading, which need not take-up any large mechanical stresses, there is adequate a sufficiently dimensioned inner wall analogous to the showing of FIG. 1. Furthermore, the cooling agent also could flow in the reverse direction to the here exemplary illustrated flow direction. Equally, it would also be possible to allow the cooling agent to flow, for instance, at the inflow edge from the base to the cover plate and at the outflow edge from the cover plate to the base. In this instance the blading core 8 could be massively constructed.

The cross-sectional view illustrated in FIG. 5 is through the turbine blading of FIG. 4, the section being taken along the line A—A of FIG. 4, and there is indicated that the cover plate 11 can be provided with additional cooling ribs 17.

Figure 6:
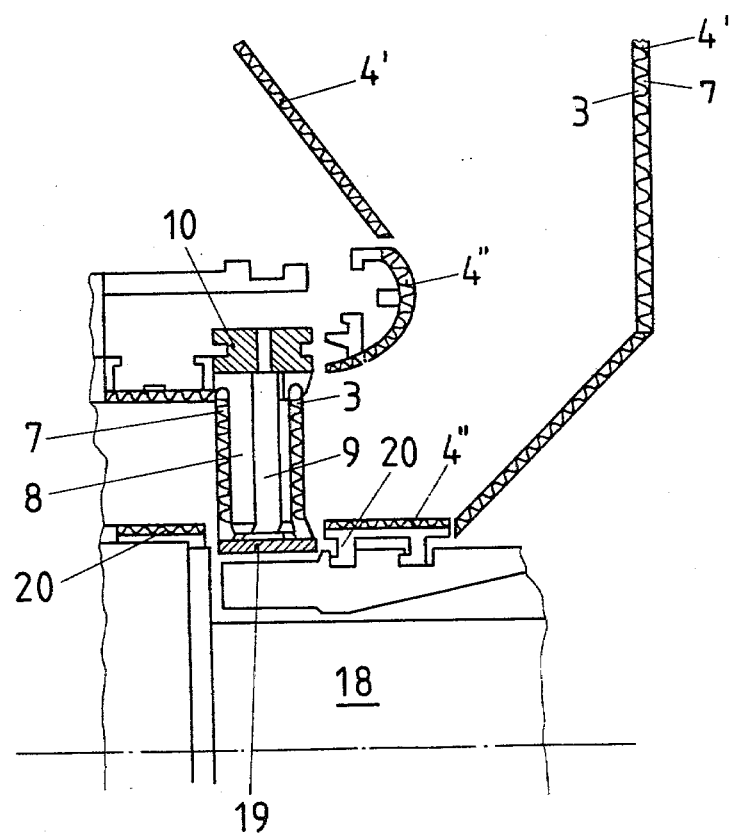
FIG. 6 is a longitudinal sectional view through the inflow channel and the first row of guide blades of a gas turbine.

FIG. 6 illustrates a fragmentary longitudinal sectional view through a gas turbine 18 having a first row of guide blades 19. With this design both the guide blades 19, the thermal dam-up or accumulation segments 20 and also the inflow portions 4" and parts of the hot gas housing 4' which are to be connected with the not particularly illustrated combustion chamber of the turbine 18 are provided with the inventive cooled walls containing the outer sheet metal plate 1, outer jacket 1', inner sheet metal plate 2 and the buckle sheet metal plates 4 constructed as partition walls. The cooling agent infeed to the cooling agent chambers or spaces 3 as well as the supply of the pressure equalization chambers with the pressurized medium is accomplished in known manner and therefore has been omitted from the showing of the drawings to simplify the illustration.

With the cooled wall constructed according to the invention it is possible in a very simple manner, with such type components, to maintain the thermal stresses small.

The use of the cooled wall of the present development is by no means limited to the here described examples, rather could be employed with all types of structure and equipment which is exposed to high thermal stresses.

While there are shown and described present preferred embodiments of the invention, it is to be distinctly understood that the invention is not limited thereto, but may be otherwise variously embodied and practiced within the scope of the following claims. Accordingly,

What we claim is:

1. A cooled wall, for instance for use with gas turbine elements, comprising:
   an outer plate;
   an inner plate cooperating with said outer plate to enable the flow of a cooling agent therebetween;
   between the outer plate and the inner plate;
   said partition wall forming with respect to the outer plate a cooling agent chamber and with respect to the inner plate a pressure equalization chamber;
   said cooled wall being used at blading of gas turbines;
   said blading essentially comprising a blading core having a flow channel, base plate, cover plate and an outer jacket which encloses in a profile-like fashion the blading core;
   said partition wall being arranged over substantially the entire length of the blading between the outer jacket and the blading core; and
   a lining arranged in said flow channel which partially covers an inner surface of said flow channel.

2. The cooled wall as defined in claim 1, wherein: said lining comprises a corrugated plate.

3. The cooled wall as defined in claim 1, wherein: said lining has a first end which is sealingly welded with the inner surface of the blading core and a second end which is sealingly welded with the cover plate.

4. The cooled wall as defined in claim 1, further including:
connection line means for connecting the pressure equalization chamber with a pressure source; and
expansion joint means by means of which the pressure equalization chamber is connected with a space between the blading core and the lining.

5. The cooled wall as defined in claim 1, wherein:
the ends of said buckle plate are sealingly welded with the cover plate and the base plate.

6. The cooled wall as defined in claim 1, wherein:
said outer and inner plates are formed of sheet metal plates.

7. The cooled wall as defined in claim 1, wherein:
said buckle plate has individual bulges; and
said individual bulges being welded with said outer plate.

8. The cooled wall as defined in claim 1, further including:
a pressure source operatively connected with said pressure equalization chamber.

* * * * *

UNITED STATES PATENT AND TRADEMARK OFFICE
CERTIFICATE OF CORRECTION

PATENT NO. : 4,359,310
DATED : November 16, 1982
INVENTOR(S) : WILHELM ENDRES et al It is certified that error appears in the above-identified patent and that said Letters Patent are hereby corrected as shown below:

Claim 1, line 5, after "therebetween;", delete "between the outer plate and the inner plate;"

Claim 1, after line 5, insert the following paragraph:
--a partition wall comprising a buckle plate arranged between the outer plate and the inner plate--

Signed and Sealed this

First Day of March 1983

[SEAL]

Attest:

GERALD J. MOSSINGHOFF

Attesting Officer     Commissioner of Patents and Trademarks